Jan. 17, 1956

S. A. MOQUIST 2,731,211

FILM REWINDING DEVICE

Filed Aug. 31, 1953

INVENTOR.
Stanley A. Moquist
BY

ATTORNEY

Jan. 17, 1956 S. A. MOQUIST 2,731,211
FILM REWINDING DEVICE
Filed Aug. 31, 1953 2 Sheets-Sheet 2
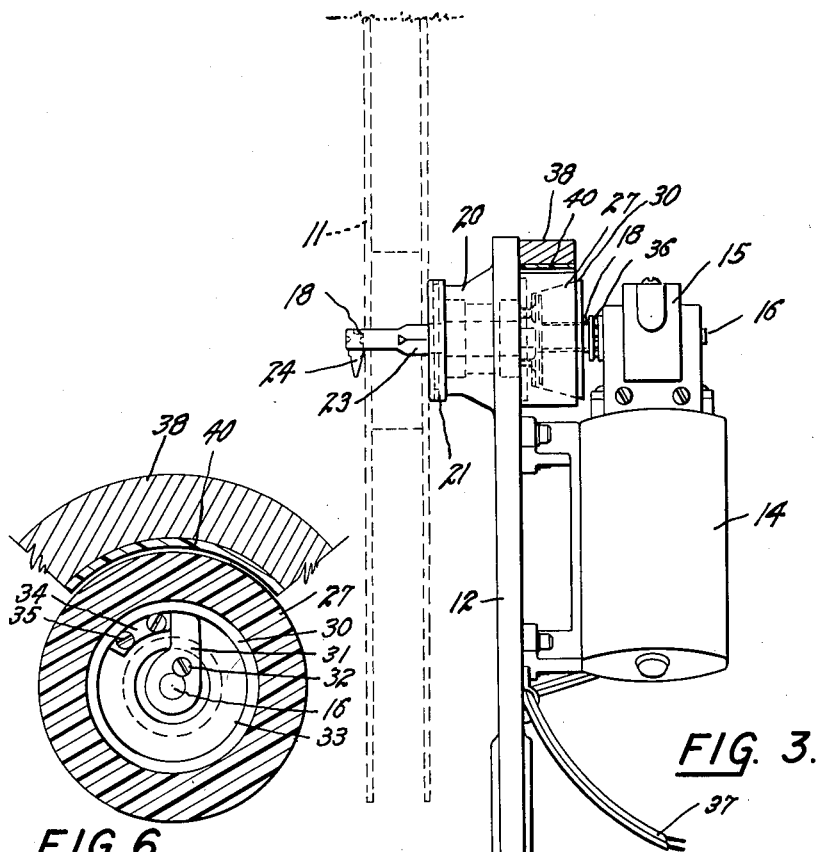
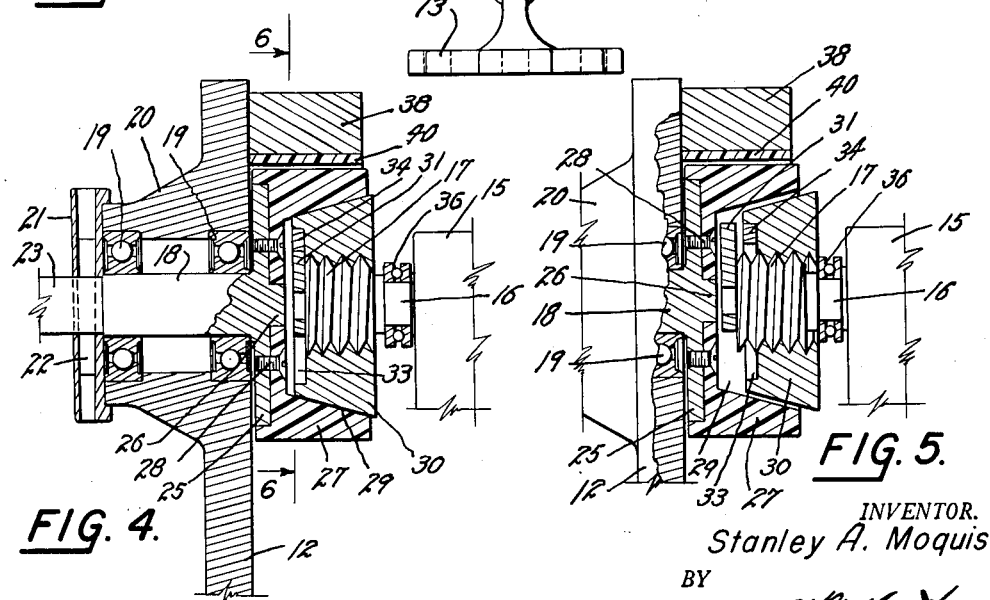
INVENTOR.
Stanley A. Moquist
BY
ATTORNEY

United States Patent Office 2,731,211
Patented Jan. 17, 1956

2,731,211
FILM REWINDING DEVICE

Stanley A. Moquist, Denver, Colo., assignor to Schoen Products, Gardena, Calif.

Application August 31, 1953, Serial No. 377,437

2 Claims. (Cl. 242—55)

This invention relates to a motion picture film rewinding device. The usual film rewinding device is objectionable for many reasons. First, when the drive motor is shut off, the winding wheel stops so suddenly that the film will continue to unwind from the unwinding reel and become loose and tangled. Second, it is difficult to rotate the winding reel by hand for starting the film thereon, checking the film, taking up the slack, etc., due to the fact that the reel is connected to the motor through the power transmission mechanism.

The principal object of this invention is to provide a motor-driven film rewinding device which will allow the winding reel to be freely rotated by hand, either forwardly or rearwardly, while the motor remains at rest, and in which the power of the motor will be immediately utilized when the motor is energized.

A further object of the invention is to provide a film rewinding device which will allow the winding reel to be rotated idly and freely, if desired, after the motor has been stopped.

A further object is to provide an efficient brake for retarding or stopping rotation of the winding reel, either with or after stoppage of the motor.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 3 is a side view thereof;

Figure 1:
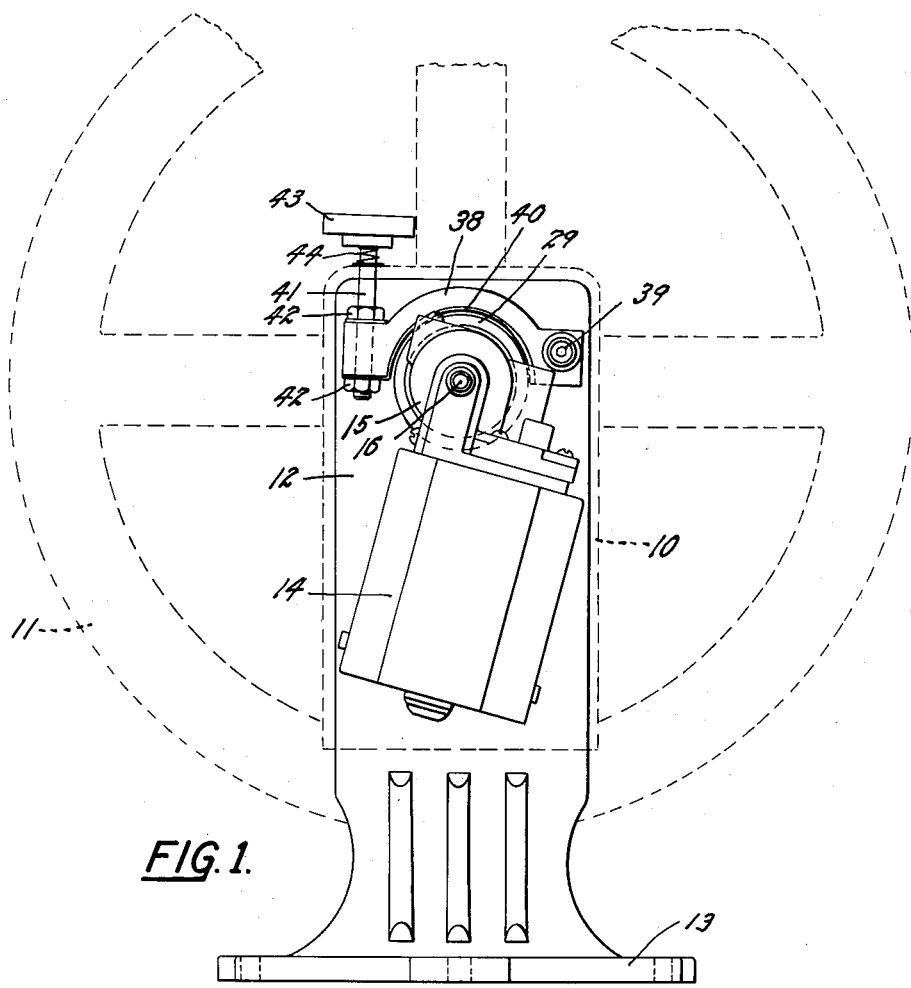
Fig. 1 is a rear view of the improved film rewinding device.
Figure 2:
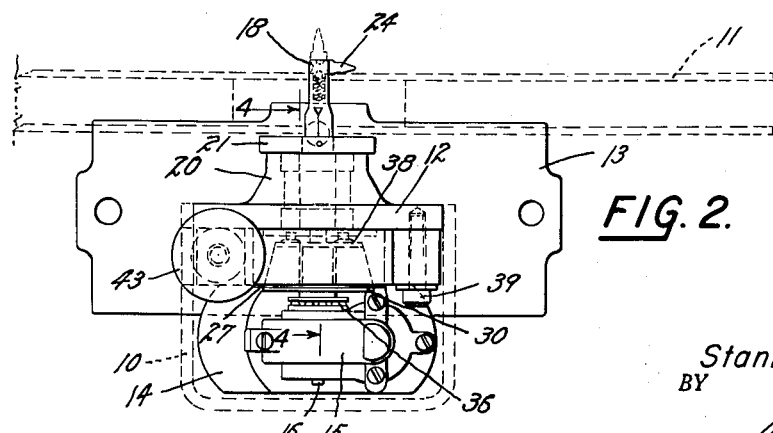
Fig. 2 is a top view thereof.

Figs. 4 and 5 are enlarged, fragmentary, vertical, longitudinal sections, taken on the line 4—4, Fig. 2, and illustrating two operative positions of the mechanism; and Fig. 6 is a similarly enlarged, detail section, taken on the line 6—6, Fig. 4.

In the drawing, a covering housing for the mechanism has been omitted and its position indicated in broken line at 10. A motion picture reel is similarly indicated in broken line at 11.

The improved winder is mounted on a frame plate 12 supported from a flat base shoe 13. An electric motor 14 is mounted on the back of the frame plate 12. The motor is of a conventional standard type having an enclosed gear reduction set mounted in a gear housing 15 on the motor. A motor shaft 16 extends from the gear housing 15 toward the frame plate 12. The forward extremity of the motor shaft 16 is formed with coarse-pitch screw threads 17.

A winding shaft 18 is rotatably mounted in suitable anti-friction bearings 19 in a hub 20 which is formed on and projects forwardly from the frame plate 12. The winding shaft 18 is positioned in exact axial alignment with the motor shaft 16. The winding shaft is locked in position in its bearings by means of a set collar 21 keyed to the shaft 18 in any suitable manner, such as by means of a taper pin 22.

The winding shaft projects forwardly from the set collar 21 a sufficient distance to receive the film reel 11, and is provided with a non-circular portion 23 for engagement with the shaft hole in the reel. The reel is held in place on the projecting shaft 18 by means of a swinging locking key 24.

The rearward extremity of the shaft 18 is formed with a clutch flange 25 and a centering boss 26. A non-metallic, cylindrical clutch block 27 is secured to the rear face of the flange 25 by means of suitable cap screws 28. The clutch block is preferably formed of Micarta or similar non-metallic material, and is provided with a conical, concentric clutch socket 29.

A tapered friction clutch member 30 is threaded upon the threads 17 of the motor shaft 16, and the threaded extremity of the motor shaft 16 is positioned within the clutch socket 29 so that the clutch member 30 can move into frictional engagement with the walls of the socket 29. The threaded extremity of the motor shaft is provided with a stop arm 31 secured thereto by means of a suitable attachment screw 32. The stop arm rotates within a cavity 33 formed in the clutch member 30 between the extremities of a stop block 34. The stop block 34 is secured to the clutch member 30 within the cavity 33 by means of suitable cap screws 35. Rearward movement of the clutch member 30 is limited by means of a thrust bearing 36 positioned between the clutch member 30 and the gear housing 15.

Let us assume that a winding reel 11 is in place on the shaft 18, and that the extremity of a film strip has been attached to the winding reel. Current is admitted to the motor 14 from any suitable source through circuit wires 37. The current to the wires 37 is preferably controlled through a suitable foot switch within reach of the operator. The motor shaft 16 starts to rotate, causing the screw threads 17 to rotate within the clutch member 30. The usual motor rotation is right-handed. Therefore, the screw threads 17 are preferably formed left-handed so that they will tend to thread out of the clutch member 30.

Since the threads are axially immovable and the clutch member 30 is movable, the latter will thread forwardly on the threads 17. The inertia of the clutch member 30 retards it sufficiently to obtain the thread-impelled advancement. This brings the circumference of the tapered clutch member 30 into circumferential, frictional engagement with the conical inner surface of the clutch socket 29 so that rotation of the motor shaft will be transmitted to the winding shaft 18 for winding the film onto the reel 11.

It has been found that, unless restricted, the clutch member 30 will at times move into such fixed engagement with the clutch socket 29 that it is difficult to relieve the clutch member from the socket. This is avoided in the present invention by the stop arm 31 which is so positioned relative to the stop block 34 that when a frictional engagement sufficient to drive the winding reel has been attained, the arm 31 will strike the block 34 to prevent further relative rotation between the clutch member 30 and the screw threads 17.

Now let us assume that the current to the motor 14 is cut off. The motor comes to an almost immediate stop. The winding shaft 18, however, continues to rotate, and in so rotating imparts rotation to the clutch member 30 to cause it to screw itself back along the screw threads 17 so that its periphery will disengage the clutch socket 29, allowing the winding reel to continue idly forward. The clutch member 30 will remain in this disengaged position, allowing the winding reel to be freely rotated in either direction by hand until the motor is again energized.

A brake member 38 is provided hinged to the frame plate 12 upon a suitable hinge stud 39. The brake is formed with a semi-cylindrical socket, preferably provided with a brake lining material 40 which partially surrounds the upper portion of the clutch block 27.

An operating stud 41 is secured at the free extremity of the brake 38, preferably between lock nuts 42, and extends upwardly, terminating in a brake button 43. The brake button 43 is constantly urged upwardly by means of a compression spring 44 compressed between the button and the housing 10 so that normally the brake has no function on the block 27 unless the brake button 43 is manually depressed.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A film winding device comprising: a stationary vertical frame plate; a winding shaft horizontally journalled in said frame plate; a circular clutch flange fixedly mounted on the rear extremity of said winding shaft; means on the forward extremity of said shaft for receiving a motion picture reel; a clutch block concentrically secured to said clutch flange; a conical concentric clutch cavity in said clutch block; a drive shaft projecting concentrically into and terminating within said clutch cavity; bearing means supporting said drive shaft; threads formed on the extremity of said drive shaft within said cavity; a tapered friction clutch member threaded onto said threads and adapted to move forwardly on the threads on said drive shaft into engagement with the walls of said clutch cavity when said drive shaft rotates forwardly, and to move rearwardly on the threads on said drive shaft out of engagement with the walls of said clutch cavity when said clutch block rotates forwardly at a relatively higher speed than said drive shaft; a stop member affixed to the extremity of said drive shaft and projecting radially therefrom within said cavity between the bottom of said clutch cavity and said clutch member; and an abutment on said clutch member positioned to contact said stop member to prevent further forward entering movement of said clutch member beyond a preset point.

2. A film winding device comprising: a stationary vertical frame plate; a winding shaft horizontally journalled in said frame plate; a circular clutch flange fixedly mounted on the rear extremity of said winding shaft; means on the forward extremity of said shaft for receiving a motion picture reel; a clutch block concentrically secured to said clutch flange; a conical concentric clutch cavity in said clutch block; a drive shaft projecting concentrically into and terminating within said clutch cavity; bearing means supporting said drive shaft; threads formed on the extremity of said drive shaft within said cavity; a tapered friction clutch member threaded onto said threads and adapted to move forwardly on the threads on said drive shaft into engagement with the walls of said clutch cavity when said drive shaft rotates forwardly, and to move rearwardly on the threads on said drive shaft out of engagement with the walls of said clutch cavity when said clutch block rotates forwardly at a relatively higher speed than said drive shaft; a stop arm secured to the extremity of said drive shaft and projecting radially therefrom, said clutch member being provided with a concentric socket adjacent the extremity of said drive shaft for receiving said stop arm; and a stop block secured to said clutch member within said cavity positioned to contact said stop arm to limit the relative rotation between said clutch member and said drive shaft.

References Cited in the file of this patent

UNITED STATES PATENTS

| | | |
|---|---|---|
| 852,587 | Towler | May 7, 1907 |
| 1,018,471 | Zimmerman | Feb. 27, 1912 |
| 1,464,168 | Booth et al. | Aug. 7, 1923 |
| 1,703,140 | Flanigan | Feb. 26, 1929 |
| 1,869,436 | Pederson | Aug. 2, 1932 |
| 1,924,723 | Nowak | Aug. 29, 1933 |
| 1,944,916 | Beaver | Jan. 30, 1934 |
| 2,321,150 | Lewis | June 8, 1943 |
| 2,349,925 | Andreau | May 30, 1944 |
| 2,530,764 | Gleasman | Nov. 21, 1950 |
| 2,621,500 | Clentimack | Dec. 16, 1952 |
| 2,652,910 | Godeck | Sept. 22, 1953 |